United States Patent
Iida et al.

(10) Patent No.: US 6,473,091 B1
(45) Date of Patent: Oct. 29, 2002

(54) IMAGE PROCESSING APPARATUS AND METHOD

(75) Inventors: Ryohei Iida, Tokyo; Takashi Takemoto, Kanagawa, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/458,167

(22) Filed: Dec. 9, 1999

(30) Foreign Application Priority Data

Dec. 11, 1998 (JP) ............................................ 10-353153

(51) Int. Cl.$^7$ ............................................... G06T 15/50
(52) U.S. Cl. ...................... 345/589; 345/422; 345/428; 345/581; 345/611; 345/505; 348/497; 348/638; 348/668; 358/518; 358/525; 358/534; 382/269
(58) Field of Search ................................ 345/418, 419, 345/420, 421, 422, 426, 428, 581–582, 586, 589, 593, 597, 596, 606, 610, 611, 612, 687, 549, 501–503, 505–506, 538, 545; 348/225–226, 239, 241, 251–252, 477, 497, 553, 607, 643–644, 664, 668, 683, 708, 910; 382/162–163, 167–168, 254–255, 268–269, 274–276, 300; 358/518–519, 523, 525, 534, 533, 536

(56) References Cited

U.S. PATENT DOCUMENTS 5,594,854 A * 1/1997 Baldwin ...................... 345/506
5,701,444 A * 12/1997 Baldwin ...................... 345/506
5,799,111 A * 8/1998 Guissin ....................... 382/254
6,111,584 A * 8/2000 Murphy ....................... 345/521
6,154,223 A * 11/2000 Baldwin ...................... 345/506
6,191,793 B1 * 2/2001 Piazza et al. ................ 345/419
6,226,017 B1 * 5/2001 Goossen ...................... 345/521
6,313,846 B1 * 11/2001 Fenney et al. .............. 345/552

OTHER PUBLICATIONS

The Open GL® Graphics System: A Specification (Version 1.2), Mark Segal, Kurt Akeley, Mar. 23, 1998.

* cited by examiner

Primary Examiner—Matthew Luu
Assistant Examiner—Wesner Sajous
(74) Attorney, Agent, or Firm—Fulwider Patton Lee & Utecht, LLP

(57) ABSTRACT

An image processing apparatus and method which can reduce the size of circuits for α-blending and dithering and realize high speed processing which perform in parallel processing for finding an amount of update of present image data to be drawn with respect to image data already stored in a display buffer by using a blending coefficient in a subtractor and a multiplier and processing for adding noise data to the image data already stored in the display buffer in a first adder and adding the data obtained by the two processing at a second adder so as to find data comprised of noise data added to data obtained by linear interpolation of two colors, then extracting color valid values at a clamp circuit, thinning out the extracted data in a rounding-off circuit, and writing it back to the display buffer.

9 Claims, 11 Drawing Sheets

FIG.2
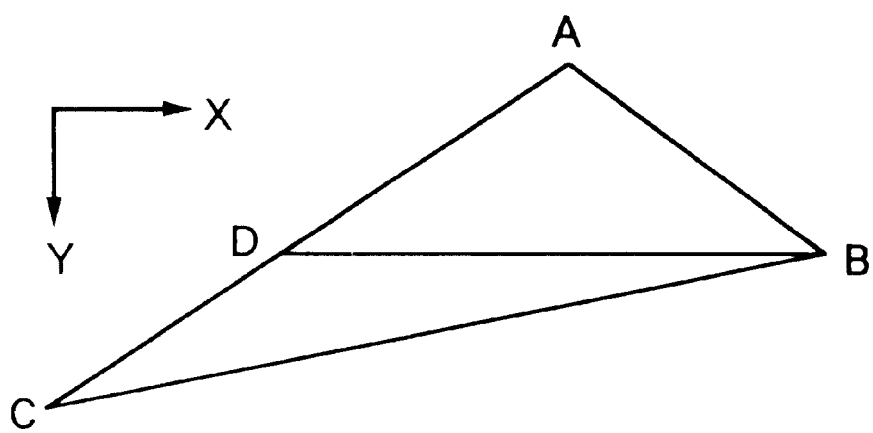
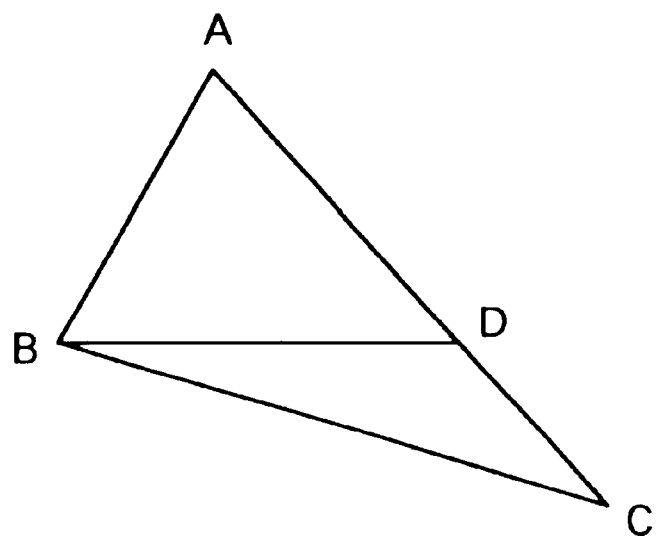
SIDE EXTENDING THE LONGEST IN Y DIRECTION IS SIDE AC

FIG.4
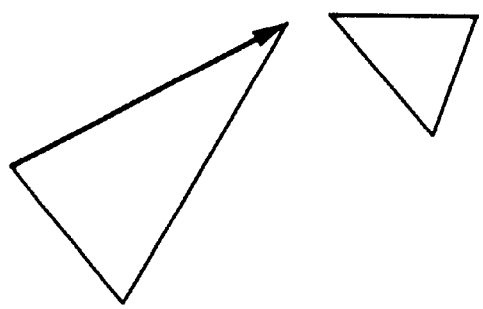
TRIANGLES ARE DIVIDED TO THREE KINDS
ONE UPPER-MOST POINT, AND CONTINUOUS SIDE IS ON THE LEFT
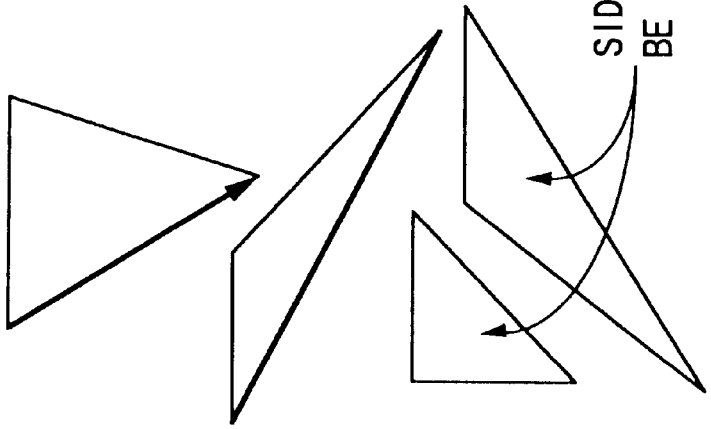
TOP SIDE IS HORIZONTAL (SIDE ON THE LEFT IS BASE)
SIDE ON THE RIGHT CAN BE BASE IN THIS CASE
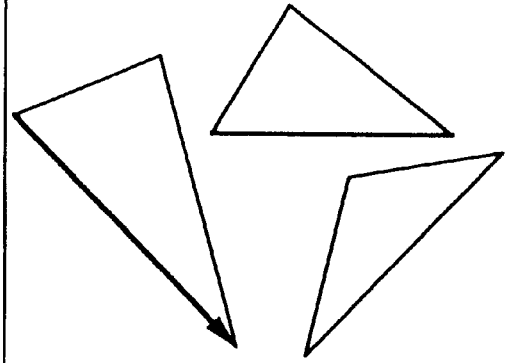
ONE UPPER-MOST POINT, AND CONTINUOUS SIDE IS ON THE RIGHT

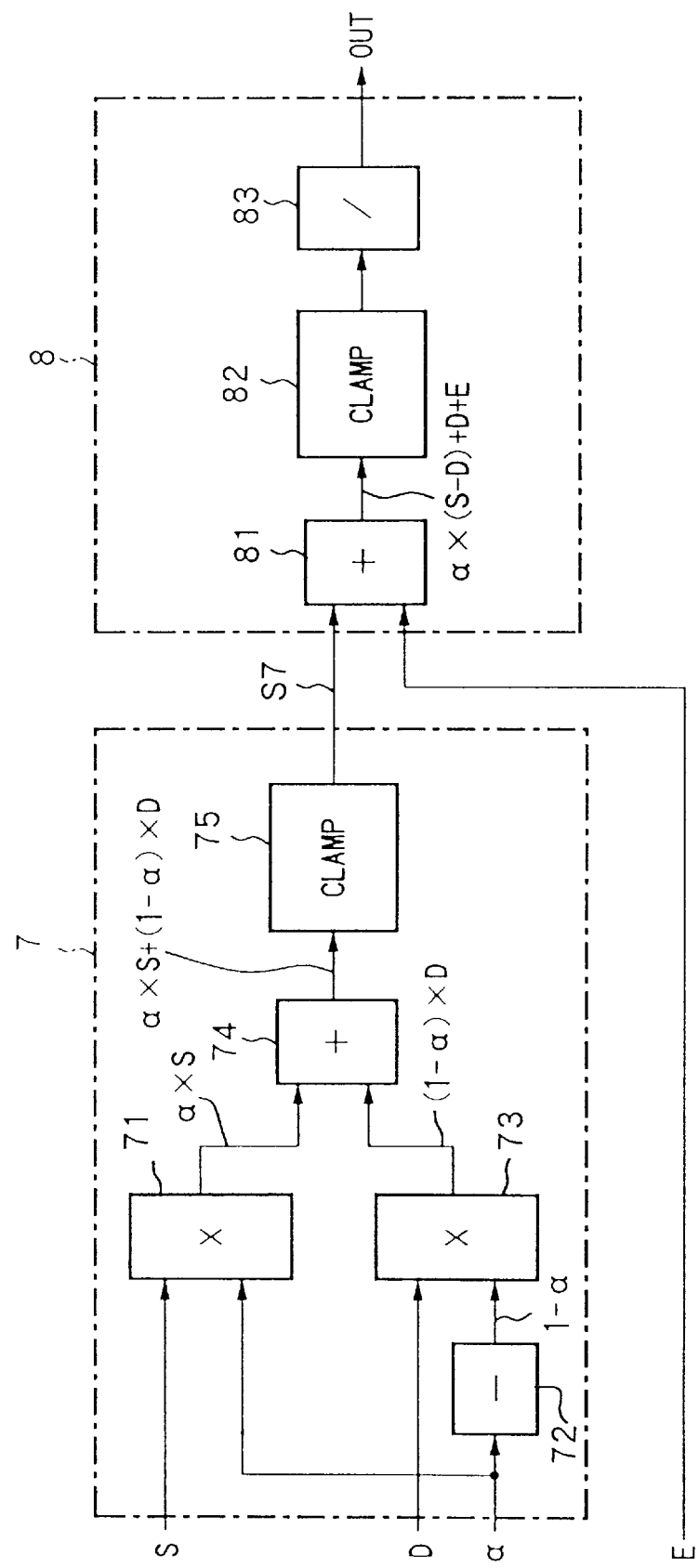

IMAGE PROCESSING APPARATUS AND METHOD

BACKGROUND OF THE INVENTION

1. Field of the Invention

The present invention relates to an image processing apparatus for performing so-called α-blending and dithering and a method for the same.

2. Description of the Related Art

Computer graphics are often used in a variety of computer aided design (CAD) systems and amusement machines. Especially, along with the recent advances in image processing techniques, systems using three-dimensional computer graphics are becoming rapidly widespread.

In three-dimensional computer graphics, the color value of each pixel is calculated at the time of deciding the color of each corresponding pixel. Then, rendering is performed for writing the calculated value to an address of a display buffer (frame buffer) corresponding to the pixel.

One of the rendering methods is polygon rendering. In this method, a three-dimensional model is expressed as an composite of triangular unit graphics (polygons). By drawing the polygons as units, the colors of the pixels of the display screen are decided.

In polygon rendering, coordinates (x, y, z), color data (R, G, B, α), homogeneous coordinates (s, t) of texture data indicating a composite image pattern, and a value of the homogeneous term q for the respective vertexes of the triangle in a physical coordinate system are input and processing is performed for interpolation of values inside the triangles.

Here, the homogeneous term q is, simply stated, like an expansion or reduction rate. Coordinates in a UV coordinate system of an actual texture buffer, namely, texture coordinate data (u, v), are comprised of the homogeneous coordinates (s, t) divided by the homogeneous term q to give "s/q" and "t/q" which in turn are multiplied by texture sizes USIZE and VSIZE, respectively.

FIG. 10 is a view of the system configuration of the basic concept of a three-dimensional computer graphics system.

In a three-dimensional computer graphics system, graphic drawing data and other data are given to a rendering circuit 5 having a rendering processor 5a and a frame buffer memory 5b from a main memory 2 of a main processor 1 or an I/O interface circuit 3 for receiving graphic data from the outside via a main bus 4.

In the rendering processor 5a, a frame buffer 5b for holding data to be displayed and a texture memory 6 for holding texture data to be applied on the surface of a graphic element to be drawn (for example, a triangle) are connected.

The rendering processor 5a performs processing for drawing a graphic element applied with texture on its surface for every graphic element.

The frame buffer 5b and the texture memory 6 are generally configured by a dynamic random access memory (DRAM).

In the system in FIG. 10, the frame buffer 5b and the texture memory 6 are configured to be physically separate memory systems.

When drawing image data, α-blending is performed for blending (R, G, B) data included in the current image data and (R, G, B) data already stored in the frame buffer 5b by a blending value indicated by α-data corresponding to the current image data. Furthermore, dithering is performed for thinning the image data after the α-blending in consideration of the capacity of the frame buffer 5b etc., then the dithered (R, G, B) data is written back to the frame buffer 5.

In other words, α-blending is processing for linear interpolation of two colors to apply a color between the two, while dithering is processing for adding noise data to the data subjected to the α-blending and then thinning out the data to make a small number of colors appear as many colors.

FIG. 11 is a block diagram of an example of the configuration of an α-blending circuit and a dithering circuit of the related art.

The α-blending circuit 7 is composed of a multiplier 71 for multiplying current image data S (for example, an 8-bit integer expressing [0,255]) and a blending coefficient α (for example, an 8-bit integer expressing [0,2]), a subtractor 72 for subtracting the blending coefficient α from 1, a multiplier 73 for multiplying image data D already stored in the frame buffer memory 5b (for example, an 8-bit integer expressing [0,255]) and an output of the subtractor 72, an adder 74 for adding an output of the multiplier 71 and an output of the multiplier 73, and a clamp circuit 75 for extracting a valid value (for example, [0,255]) of a color value from the data obtained by the adder 74.

In the α-blending circuit 7, as shown in FIG. 11, data α×S+(1−α)×D is obtained from input values S, D, and α in the same way as the output of the adder 74.

The dithering circuit 8 is configured by an adder 81 for adding error data E (for example, a 3-bit integer expressing [−4,3]) as noise data to an output signal S7 of the α-blending circuit 7, a clamp circuit 82 for extracting a valid value of a color value from an output of the adder 81, and a round-off circuit (dividing circuit) 83 for discarding (thinning out) the lower three bits of an output of the clamp circuit 82 and writing back the upper 5 bits to the frame buffer 5b.

In the dithering circuit 8, as shown in FIG. 11, data α(S−D)+D+E is obtained from input values α×S+(1−α)×D and E in the same way as an output of the adder 81.

Summarizing the problems to be solved by the invention, as explained as above, however, since the α-blending circuit 7 and the dithering circuit 8 are separately provided and configured to be connected in series in an image processing apparatus of the related art, the size of the circuit becomes large and the calculation time becomes long, which are obstacles to high speed processing.

Also, in a so-called built-in DRAM system of the related art in the above three-dimensional computer graphics system, there have been the following disadvantages when a frame buffer memory and a texture memory are provided separately in separate memory systems.

That is, there is the disadvantage that a frame buffer emptied due to a change of the display resolution cannot be used as a texture buffer or the disadvantage that the performance has to be sacrificed because of the large overhead, such as page exchange, of the DRAM in simultaneous access of the frame buffer memory and the texture buffer memory when the two are made physically integral.

SUMMARY OF THE INVENTION

An object of the present invention is to provide an image processing apparatus which can reduce the size of the circuits for α-blending and dithering, can realize high speed processing, enables use of a memory region emptied due to a change in the display resolution for texture applications, can prevent an increase of overhead for page exchange etc., and enables flexible and high speed processing without causing a decline in performance, and a method for the same.

To attain the above object, according to a first aspect of the present invention, there is provided an image processing apparatus for performing α-blending and dithering on image data, comprising a storage circuit in which at least display image data is drawn and a logic circuit for finding data on the amount of update of present image data to be drawn from image data already stored in the storage circuit using a given blending coefficient α, finding the data comprised of noise data added to the image data stored in the storage circuit, adding the two obtained data to find data comprised of the noise data added to data obtained by linear interpolation of two colors, extracting valid value of color from the data, thinning out the extracted data, and writing back the same to the storage circuit.

According to a second aspect of the present invention, there is provided an image processing apparatus for performing rendering by receiving polygon rendering data including three-dimensional coordinates (x, y, z), R (red), G (green), and B (blue) data, a blending coefficient α, homogeneous coordinates (s, t) of texture, and homogeneous tern q with respect to each vertex of the unit graphic, at least comprising a storage circuit for storing display image data and texture data required by at least one graphic element; a drawing data control circuit for finding data on the amount of update of present image data to be drawn from image data already stored in the storage circuit using a given blending coefficient α, finding the data comprised of noise data added to the image data stored in the storage circuit, adding the two obtained data to find data comprised of the noise data added to data obtained by linear interpolation of two colors, extracting valid value of color from the data, thinning out the extracted data, and writing back the same to the storage circuit; an interpolation data generation circuit for interpolating polygon rendering data of vertexes of the unit graphic and generating interpolation data of pixels positioned inside the unit graphic; and a texture processing circuit for dividing homogeneous coordinates (s, t) of texture included in the interpolation data by a homogeneous term q to generate "s/q" and "t/q", using texture data corresponding to the "s/q" and "t/q" to read texture data from the storage circuit, and performing processing for applying the texture data to the surface of a graphic element of the display use image data; the storage circuit, the drawing data control circuit, the interpolation data generation circuit, and the texture processing circuit being accommodated in one semiconductor chip.

According to a third aspect of the present invention, there is provide an image processing method for drawing in a storage circuit by performing α-blending and dithering on image data, including the steps of performing in parallel processing for finding data on the amount of update of present image data to be drawn from image data already stored in the storage circuit using a given blending coefficient α and processing for adding noise data to the image data stored in the storage circuit and adding the data obtained by the two processing to find data comprised of the noise data added to data obtained by linear interpolation of two colors and extracting valid value of color from the data, thinning out the extracted data, and writing back the same to the storage circuit.

According to the present invention, data of an amount of update of current image data to be drawn from now with respect to image data already stored in the storage circuit is first obtained in a logic circuit by using a given blending coefficient α. In parallel with this, data comprised of noise data added to the image data stored in the storage circuit is obtained.

Next, the data obtained by the two processings are added and data comprised of the noise data added to the image data after the α-blending is obtained.

Then, valid value of colors is extracted from the added data and the extracted data is thinned out by rounding off processing etc. and written back to the storage circuit.

Namely, the α-blending and the dithering are performed by a simplified circuit in a short time.

Also, according to the present invention, by mounting a DRAM or other storage circuit and a logic circuit together on a single semiconductor chip and by storing display image data and texture data required by at least one graphic element in the built in storage circuit, the built-in memory can be effectively used.

Furthermore, by giving identical functions as in the storage circuit to a plurality of modules in parallel, the efficiency of the parallel operation is improved. The usage efficiency of data declines and the performance can be improved only in limited conditions when only the number of bits in the data is large, however, by providing a plurality of modules having a certain extent of a function to improve to the average performance, bit lines can be efficiently used.

Also, the bit lines can be further efficiently used by improving the arrangement of the built-in storage circuit, that is, the address spaces occupied by the independent memory+function modules.

When frequently accessing a relatively fixed display region as in graphic drawing, by arranging display elements of adjacent addresses in mutually different memory blocks, the probability that the respective modules can be simultaneously operated increases and the drawing performance can be improved. The frequent accesses to a fixed region is caused when drawing an inside of a closed region of, for example, a triangle, in which the internal display elements are mutually adjacent. Therefore such accesses to a region have adjacent addresses.

BRIEF DESCRIPTION OF THE DRAWINGS

These and other objects and features of the present invention will become clearer from the following description of the preferred embodiments given with reference to the accompanying drawings, in which:

FIG. 2 is a view for explaining the function of a DDA set-up circuit according to the present invention;

FIG. 4 is a view for explaining sorting of vertexes of a triangle DDA circuit according to the present invention;

FIG. 11 is a block diagram of an example of the configuration of an α-blending circuit and a dithering circuit of the related art.

DESCRIPTION OF THE PREFERRED EMBODIMENTS

Below, preferred embodiments of the present invention will be described with reference to the accompanying drawings.

A three-dimensional computer graphics system applied to personal computers and the like for displaying a desired three-dimensional image of any three-dimensional object model on a cathode ray tube (CRT) or other display at a high speed will be explained below.

Figure 1:
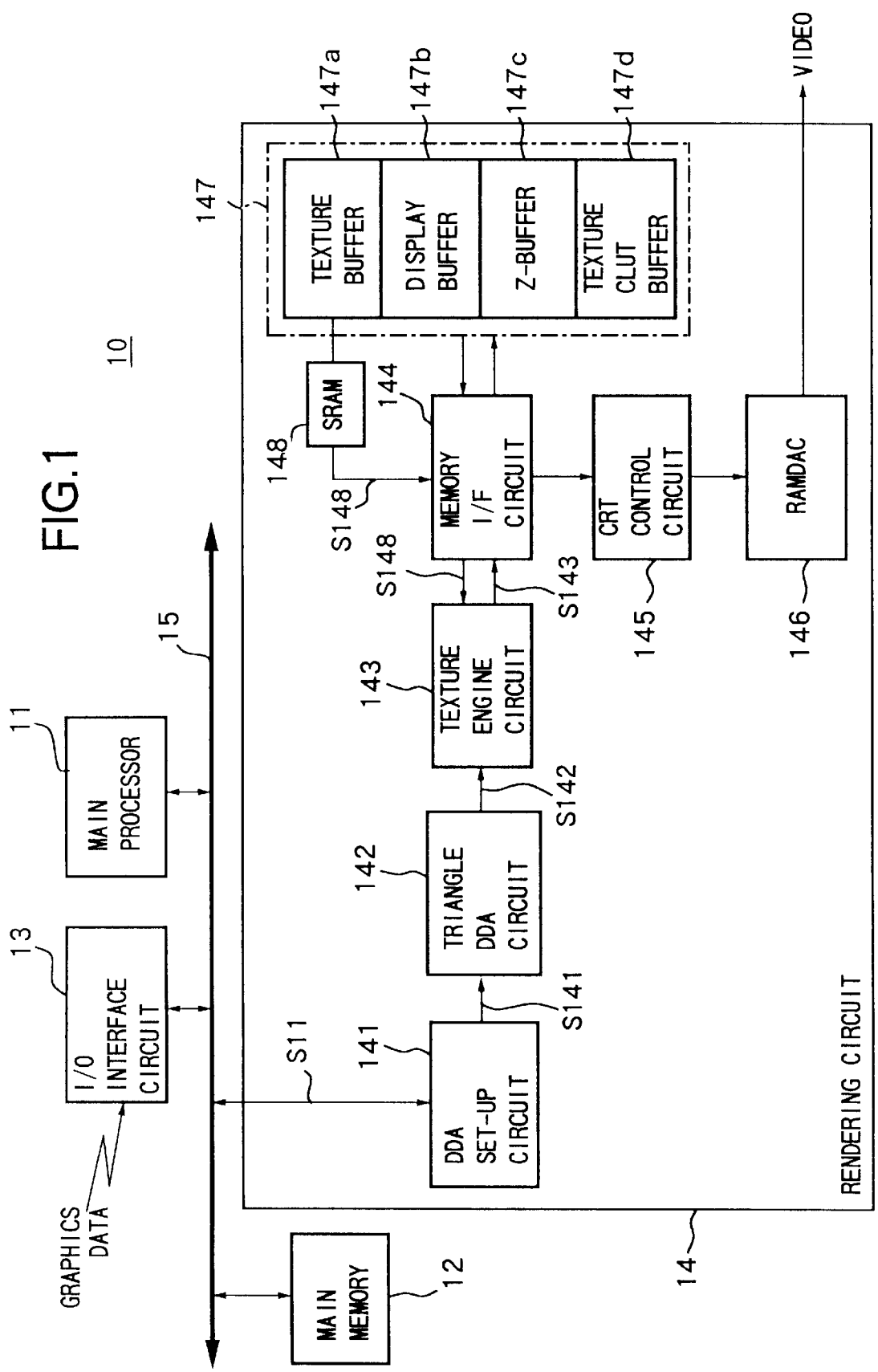
FIG. 1 is a block diagram of the configuration of a three-dimensional computer graphics system according to the present invention.

FIG. 1 is a view of the system configuration of a three-dimensional computer graphics system 10 as an image processing apparatus according to the present invention.

In the three-dimensional computer graphics system 10, a three-dimensional model is expressed by a composite of triangular unit graphics (polygons). By drawing the polygons, this system can decide the color of each pixel on the display screen and perform polygon rendering for display on the screen.

In the three-dimensional computer graphics system 10, a three-dimensional object is expressed by using a z-coordinate for indicating the depth in addition to the (x, y) coordinates for indicating positions on a two-dimensional plane. Any one point of the three dimensional space can be specified by the three coordinates (x, y, z).

As shown in FIG. 1, in the three-dimensional computer graphics system 10, a main processor 11, a main memory 12, an I/O interface circuit 13, and a rendering circuit 14 are connected via a main bus 15.

Below, the functions of the respective components will be explained.

The main processor 11, for example, in accordance with the state of progress in an application, reads the necessary graphic data from the main memory 12 and performs clipping, lighting, or other geometrical processing on the graphic data to generate the polygon rendering data. The main processor 11 outputs the polygon rendering data S11 to the rendering circuit 14 via the main bus 15.

The I/O interface circuit 13 receives as input motion control information or the polygon rendering data etc. from the outside in accordance with need and outputs the same to the rendering circuit 14 via the main bus 15.

Here, the polygon rendering data includes data of each of the three vertexes (x, y, z, R, G, B, α, s, t, g, F) of the polygon.

Here, the (x, y, z) data indicates the three-dimensional coordinates of a vertex of the polygon, and (R, G, B) data indicates the luminance values of red, green, and blue at the three-dimensional coordinates, respectively.

The data α indicates a coefficient of blending the R, G, B data of a pixel to be drawn and that of a pixel already stored in the display buffer 147b.

Among the (s, t, q) data, the (s, t) indicates homogeneous coordinates of a corresponding texture and the g indicates the homogenous term. Here, the texture size USIZE and VSIZE are respectively multiplied with the "s/q" and "t/q" to obtain coordinate data (u, v) of the texture. The texture coordinate data (u, v) is used for accessing the texture data stored in the texture buffer 147a.

The F data indicates an α-value of fogging.

Namely, the polygon rendering data indicates physical coordinate values of the vertexes of a triangle and values of colors of the vertexes, texture, and fogging.

The rendering circuit 14 will be explained in detail below.

As shown in FIG. 1, the rendering circuit 14 comprises a digital differential analyzer (DDA) set-up circuit 141, a triangle DDA circuit 142, a texture engine circuit 143, a memory interface (I/F) circuit 144, a CRT control circuit 145, a random access memory (RAM) DAC circuit 146, a dynamic random access memory (DRAM) 147, and a static random access memory (SRAM) 148.

The rendering circuit 14 in the present embodiment is provided with a logic circuit and a DRAM 147 for storing at least display image data (hereinafter, referred to as display data) and texture data together in one semiconductor chip.

Dram 147

The DRAM 147 functions as a texture buffer 147a, a display buffer 147b, a z-buffer 147c, and a texture color look-up table (CLUT) buffer 147d.

Also, the DRAM 147 is, as will be described later on, divided into a plurality of modules (four in this embodiment) having identical functions.

Also, the DRAM 147 stores an index for index colors and color look-up table values therefor in the texture CLUT buffer 147b in order to store as much texture data as possible.

The index and the color look-up table values are used for texture processing. Namely, a texture element is normally expressed by the total 24 bits of the 8 bits of each of R, G, and B. With this, however, the amount of data swells, so one color is selected from, for example, 256 colors selected in advance and that data is used for the texture processing. As a result, with 256 colors, the texture elements can be expressed by 8 bits. A conversion table from the indexes to an actual color is necessary. However, the higher the resolution of the texture, the more compact the texture data can become.

Due to this, compression of the texture data becomes possible and the built-in DRAM can be used efficiently.

Further, depth information of the object to be drawn is stored in the DRAM 147 in order to perform hidden plane processing simultaneously and in parallel with the drawing.

Note that as a method of storing the display data, the depth data, and the texture data, the display data is continuously stored from the top position in the memory block, then the depth data is stored, and then the texture data is stored in continuous address spaces for each type of texture in the remaining vacant region. As a result, the texture data can be stored efficiently.

DDA Set-Up Circuit 141

Prior to the succeeding triangle DDA circuit 142 performing linear interpolation on the values of the vertexes of a triangle in a physical coordinate system to obtain information of the color and depth of the pixels inside the triangle, the DDA set-up circuit 141 performs a set-up operation for obtaining the difference of a side of the triangle from a horizontal direction etc. for the data (z, R, G, B, α, s, t, q, F) indicated by the polygon rendering data S11.

Specifically, this set-up operation uses values of a starting point and an end point and the distance between the two points to calculate the change of values sought in the case of movement by a unit length.

The DDA set-up circuit 141 outputs the calculated change data S141 to the triangle DDA circuit 142.

The function of the DDA set-up circuit 141 will be further explained with reference to FIG. 2.

As explained above, the main processing of the DDA set-up circuit 141 is to obtain the change inside a triangle composed of three vertexes given various information (color, blending ratio, texture coordinates, and fogging color) at vertexes reduced to physical coordinates through the former geometric processing so as to calculate basic data for the later linear interpolation.

Note that the data of each vertex of the triangle is, for example, configured by 16 bits of x- and y-coordinates, 24 bits of the z-coordinate, 12 bits (=8+4) of the color values for the RGB, 32 bits of floating decimal values (IEEE format) of the s, t, q texture coordinates, 12 bits of α coefficient, and 12 bits of the fogging coefficient.

The drawing of a triangle is reduced to the drawing of a horizontal line, but this makes it necessary to obtain the starting values at the starting point of the drawing of the horizontal line.

In drawing the horizontal line, the direction of drawing is made constant in one triangle. For example, when drawing from the left to the right, the X with respect to a displacement in the Y-direction of a side on the left and the above various changes are calculated first, then these are used to find the X-coordinate of the left-most point when moving from a vertex to the next horizontal line and values of the above various information (points on a side change in both the X- and Y-directions, so calculation is impossible only from the inclination of the Y-direction).

Only the position of the end point is required for the side on the right, so only the change of x with respect to the displacement in the Y-direction need be investigated.

Regarding the drawing of a horizontal line, since the inclination in the horizontal direction is uniform in the same triangle, the inclinations of the above various information are calculated.

The given triangle is sorted in the Y-direction and the uppermost point is set to be A. Next, the remaining two vertexes are compared in terms of the positions in the X-direction and the point on the right is set to be B. By doing this, the processing can be divided into only two or so steps.

Triangle DDA Circuit 142

The triangle DDA circuit 142 uses the change data S141 input from the DDA set-up circuit 141 to calculate the linearly interpolated (z, R, G, B, α, s, t, q, F) data at each pixel inside the triangle.

The triangle DDA circuit 142 outputs the data (x, y) for each pixel and the (z, R, G, B, α, s, t, q, F) data at the (x, y) coordinates to the texture engine circuit 143 as the DDA data (interpolation data) S142.

For example, the triangle DDA circuit 142 outputs the DDA data S142 of the 8 (=2×4) pixels positioned inside a block being processed in parallel to the texture engine circuit 143.

Figure 3:
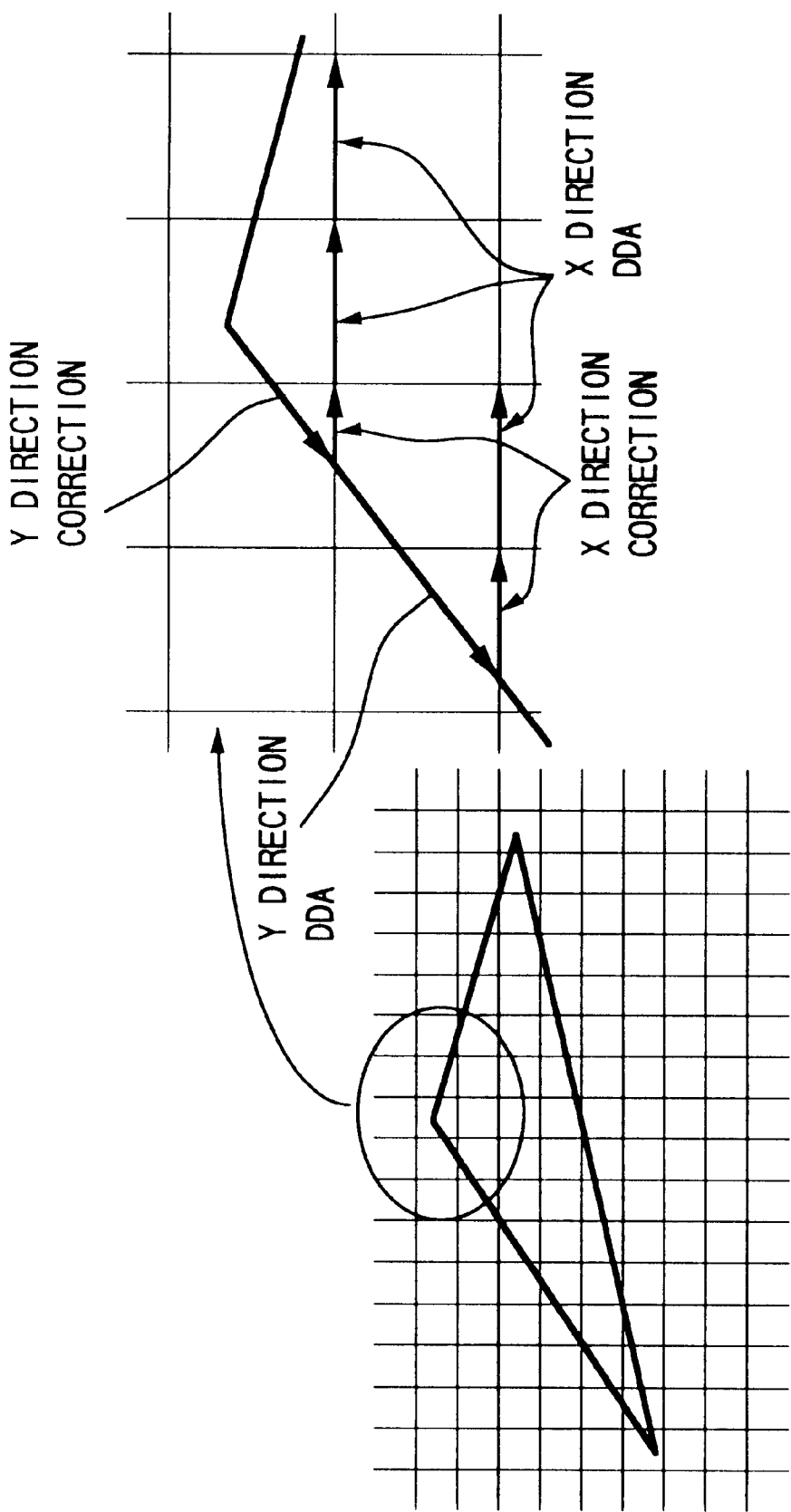
FIG. 3 is a view for explaining the function of a triangle DDA circuit according to the present invention.

A further explanation will be made of the function of the triangle DDA circuit 142 with reference to FIG. 3.

As explained above, inclination information of the above various information of the sides and horizontal direction of a triangle is prepared by the DDA set-up circuit 141. The basic processing of the triangle DDA circuit 142 receiving this information consists of the calculation of the initial values of the horizontal line by interpolation of the various information on the sides of the triangle and the interpolation of the various information on the horizontal line.

Here, what must be noted most is that the calculation of results of the interpolation requires calculation of the values at the center of a pixel.

The reason is that if the value calculated is off from the center of the pixel, while there is not much to worry about in the case of a still picture, the flickering of the image will stand out in a motion picture.

The various information at the left-most side of a first horizontal line (a line connecting the center of the pixels) can be obtained by multiplying the inclination on the side with the distance from the vertex to the first line.

The various information at the starting point of the next line can be calculated by adding the inclination of the side.

The value at the first pixel of the horizontal line can be calculated by adding the value obtained by multiplying the distance to the first pixel with the inclination in the horizontal direction to the value at the starting point of the line. The value at the next pixel of the horizontal line can be calculated by adding to the first pixel value the inclination in the horizontal direction successively.

Next, sorting of vertexes will be explained with reference to FIG. 4.

By sorting the vertexes in advance, the branching of the successive processing can be reduced to a minimum and contradictions can be made harder to occur inside one triangle as much as possible even in interpolation.

As the method of sorting, first, all of the vertexes supplied are sorted in the Y-direction and the upper-most point and the lower-most point are defined as the point A and point C, respectively. The remaining point is defined as the point B.

By doing so, in the processing, the side extending the longest in the Y-direction becomes a side AC. First, the side AC and the side AB are used for the interpolation of the region between the two sides, then interpolation is performed for the region between the side BC and the side AC, that is, leaving the side AC as it is and changing from the side AB. Also, it will be understood that it is sufficient to perform processing with respect to the side AC and the side BC for correction on the pixel coordinate lattice in the Y-direction.

Since branching of the processing after sorting becomes unnecessary in this way, the processing can be performed by simply supplying the data, bugs can be prevented from occurring, and the configuration becomes simple.

Also, since the direction of the Interpolation In one triangle can be made constant by setting a starting point on the side BC, the direction of interpolation (span) in the horizontal direction becomes constant and any computation errors which occur are accumulated from the side BC to other sides. Since the direction of the accumulation becomes constant, errors between adjacent sides become less conspicuous.

Figure 5:
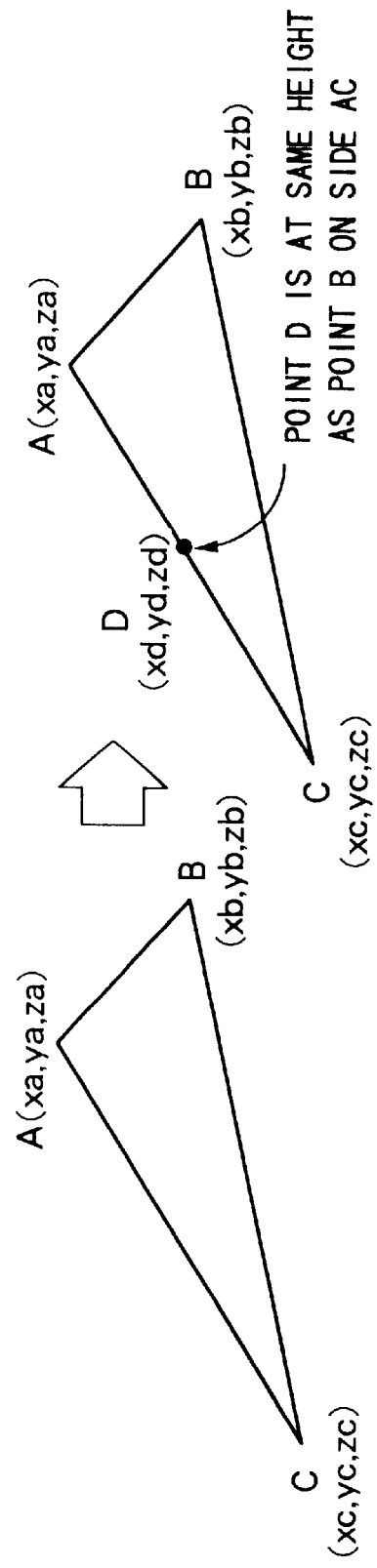
FIG. 5 is a view for explaining calculation of an inclination in the horizontal direction of the triangle DDA circuit according to the present invention.

Next, the calculation of the inclination in the horizontal direction will be explained with reference to FIG. 5.

The inclination (variables) of the variables (x, y, z, α, R, G, B, s, t, q) inside a triangle with respect to (x, y) becomes constant due to the linear interpolation.

Accordingly, the inclination in the horizontal direction, that is, the inclination on each of the horizontal lines (span), becomes constant for all spans, so the inclination is obtained prior to the processing of the spans.

As a result of sorting the given vertexes of the triangle in the Y-direction, the side AC is defined again to be the longest extending side, so there is always a point of intersection of a line extending from the vertex B in the horizontal direction and the side AC. The point is defined as D.

After this, by just obtaining the change between the point B and D, the inclination in the horizontal direction, that is, in the x-direction, can be obtained.

Specifically, the x- and z-coordinates at the point D becomes as shown in the equations below.

$$x_d = \{(y_d - y_a)/(y_c - y_a)\} \cdot (x_c - x_a)$$

$$z_d = \{(y_d - y_a)/(y_c - y_a)\} \cdot (z_c - z_a)$$

When obtaining the inclination of the variable z in the x-direction based on this, the following is obtained:

$$\Delta z / \Delta x = (z_d - z_b)/(x_d - x_b)$$
$$= [\{(y_d - y_a)/(y_c - y_a)\} \cdot (z_c - z_a) - z_b]/$$
$$[\{(y_d - y_a)/(y_c - y_a)\} \cdot (x_c - x_a) - x_b]$$
$$= \{z_b(y_c - y_a) - (z_c - z_a)(y_c - y_a)\}/$$
$$\{x_b(y_c - y_a) - (z_c - z_a)(y_c - y_a)\}$$

Figure 6A:
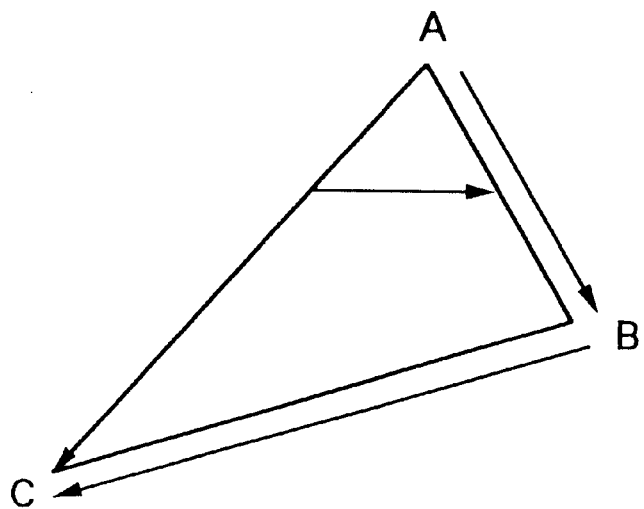
FIG. 6 is a view for explaining an interpolation procedure of vertex data of the triangle DDA circuit according to the present invention.
Figure 6B:
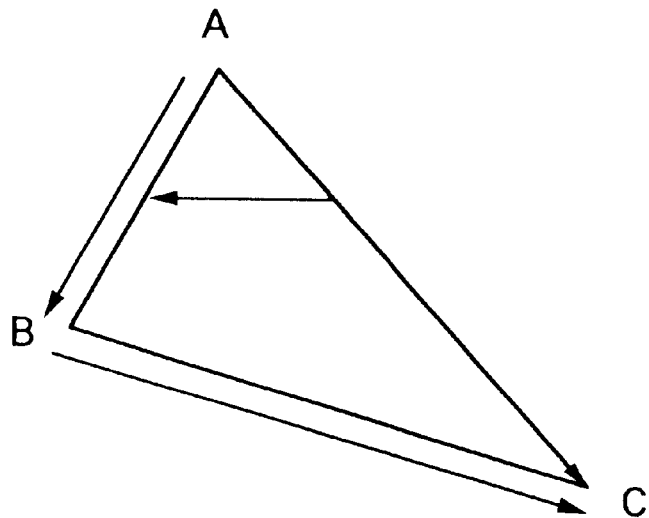
Figure 7:
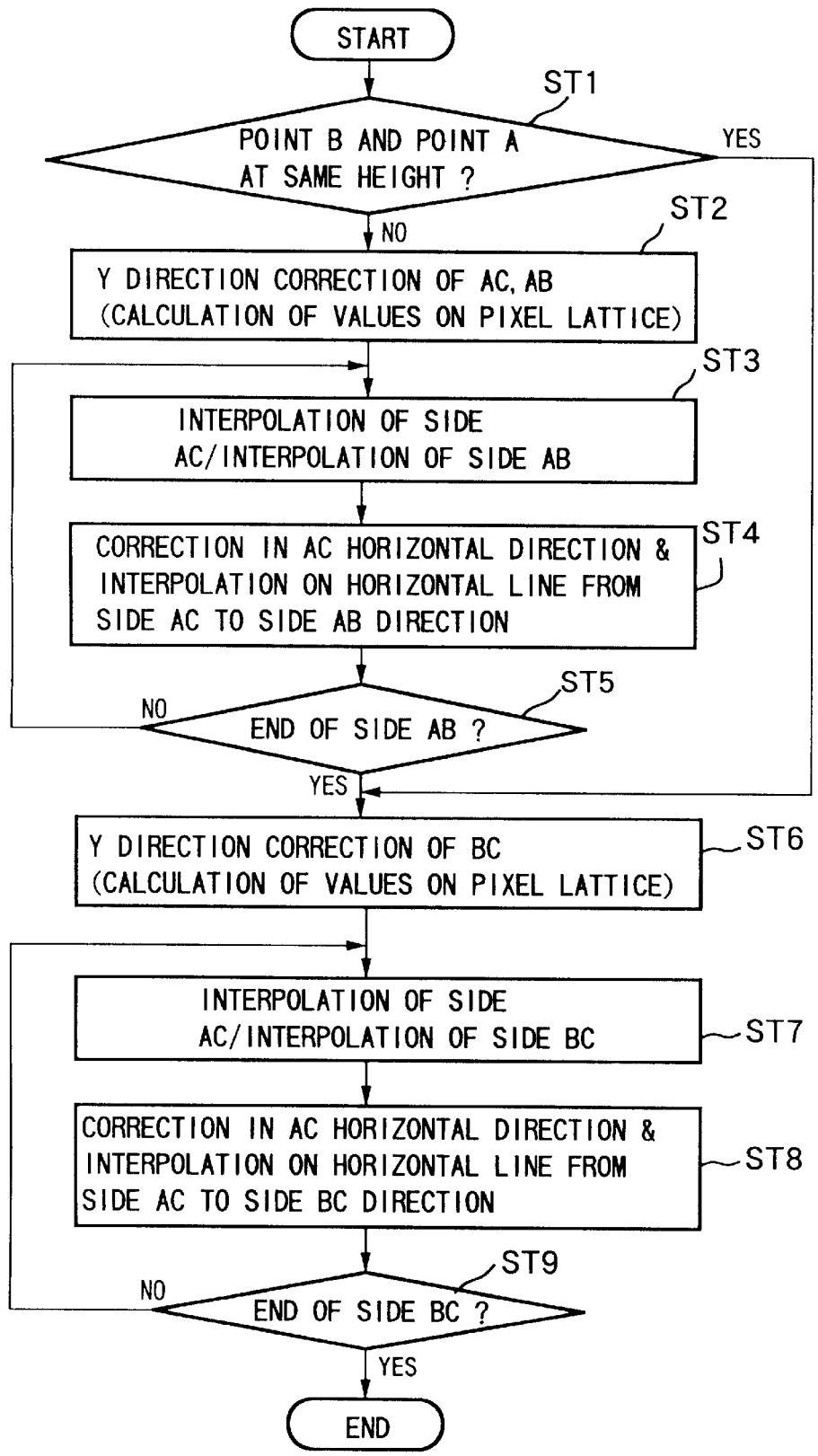
FIG. 7 is a flow chart for explaining the interpolation procedure of vertex data of the triangle DDA circuit according to the present invention.

Next, an example of the routine for interpolation of vertex data will be explained with reference to FIGS. 6 and 7.

After the processing for sorting the vertexes, calculating the inclination in the horizontal direction, and calculating the inclination on each of the sides, interpolation is carried out using the results.

Depending the position of the point B, the processing at a span splits in two directions. This is because it is desired to perform the processing by always using the side extending the longest in the Y-direction as a starting point so as to try to prevent trouble as much as possible by making the direction of accumulation of errors between respective spans in interpolation inside one triangle constant.

When the point B is at the same height as the point A, the first half of the processing is skipped. Therefore, the processing can be streamlined by just providing a skippable mechanism rather than branching.

When trying to improve the processing capability by simultaneously processing a plurality of spans, it is desired to obtain the inclination in the Y-direction, however it is necessary to carry out the processing again from the sorting of the vertexes. However, the processing before the interpolation processing is enough, so the processing system as a whole becomes simpler.

Specifically, when point B is not the same height as the point A, Y-direction correction of AC and AB (calculation of values on a pixel lattice) is performed (ST1 and ST2) and the interpolation on the side AC and the interpolation on the side AB are performed (ST3).

Then, the correction in the AC horizontal direction and the interpolation on the horizontal line from the side AC in the side AB direction (ST4) are carried out.

The above processing of steps ST3 and ST4 are performed until the end of the side AB (ST5).

When the processing of steps ST2 to ST4 until the end of the side AB is completed or when it is judged at step ST1 that the point B is the same height as the point A, the Y-direction correction of BC (calculation of values on the pixel lattice) is carried out (ST6) and the interpolation on the side AC and the interpolation on the side BC are carried out (ST7).

Then, the correction in the AC horizontal direction and the interpolation on the horizontal line (span) are carried out (ST8).

The processing of the above steps ST7 and ST8 is carried out until the end of the side BC (ST9).

Texture Engine Circuit 143

The texture engine circuit 143 performs the calculation of "s/q" and "t/q", the calculation of the texture coordinate data (u, v), the reading of the (R, G, B, α) data from the texture buffer 147a, and the blending (α-blending) in a pipeline format.

Note that the texture engine circuit 143 performs the processing on the 8 pixels positioned inside a predetermined block simultaneously in parallel.

The texture engine circuit 143 performs the operation for dividing the data s by the data q and the operation for dividing the data t by the data q on the (s, t, q) data indicated by the DDA data S142.

The texture engine circuit 143 is provided with, for example, eight division circuits, not illustrated, and performs the division "s/q" and "t/q" simultaneously on the 8 pixels.

Also, the texture engine circuit 143 respectively multiplies the texture sizes USIZE and VSIZE with the division results "s/q" and "t/q" to generate the texture coordinate data (u, v).

The texture engine circuit 143 outputs a read request including the generated texture coordinate data (u, v) to the SRAM 148 or DRAM 147 via the memory I/F circuit 144. The texture engine circuit 143 obtains the (R, G, B, α) data S148 stored at the texture address corresponding to the (s, t) data by reading the texture data stored in the SRAM 148 or in the texture buffer 147a via the memory I/F circuit 144.

Here, the texture data stored in the texture buffer 147a is stored in the SRAM 148 as explained above.

The texture engine circuit 143 generates pixel data S143 by combining etc. the (R, G, B) data in the read (R, G, B, α) data S148 and the (R, G, B) data included in the DDA data S142 from the former triangle DDA circuit 142 by blending (for example, by respectively multiplying) the two by the ratio indicated by the α data included in the (R, G, B, α) data S148.

The texture engine circuit 143 outputs the pixel data S143 to the memory I/F circuit 144.

Note that in the texture buffer 147a, MIPMAP (texture for a plurality of resolutions) and other texture data corresponding to a plurality of reducing rates is stored. Here, which reducing rate texture data to use is determined in the above triangular units using a predetermined algorithm.

In the case of a full color mode, the texture engine circuit 143 directly uses the (R, G, B, α) data read from the texture buffer 147a.

In the case of an index color mode, the texture engine circuit 143 reads a color look-up table (CLUT), prepared in advance, from the texture CLUT buffer 147d, transfers and stores the same in the built-in SRAM, and uses the color look-up table to obtain the (R, G, B) data corresponding to the color index read from the texture buffer 147a.

Memory I/F Circuit 144

The memory I/F circuit 144 compares the z-data. corresponding to the pixel data S143 input from the texture engine circuit 143 with the z-data stored in the z-buffer 147c and judges whether the image drawn by the input pixel data S143 is positioned closer to the viewing point than the image written in the display buffer 147b the previous time. When it is judged that the image drawn by the input pixel data S143 is positioned closer, the memory I/F circuit 144 updates the z-data stored in the z-buffer 147c by the z-data corresponding to the image data S143.

Also, the memory I/F circuit 144 performs in parallel, in accordance with need, the α-blending for blending the (R, G, B) data included in the image data S143 and the (R, G, B) data already stored in the display buffer 147b by the blending ratio indicated by the α-data corresponding to the image data S143 and the dithering for thinning out (rounding off) data in consideration of the capacity, etc. of the display buffer 147b and writes the (R, G, B) data after the processing to the display buffer 147b.

Figure 8:
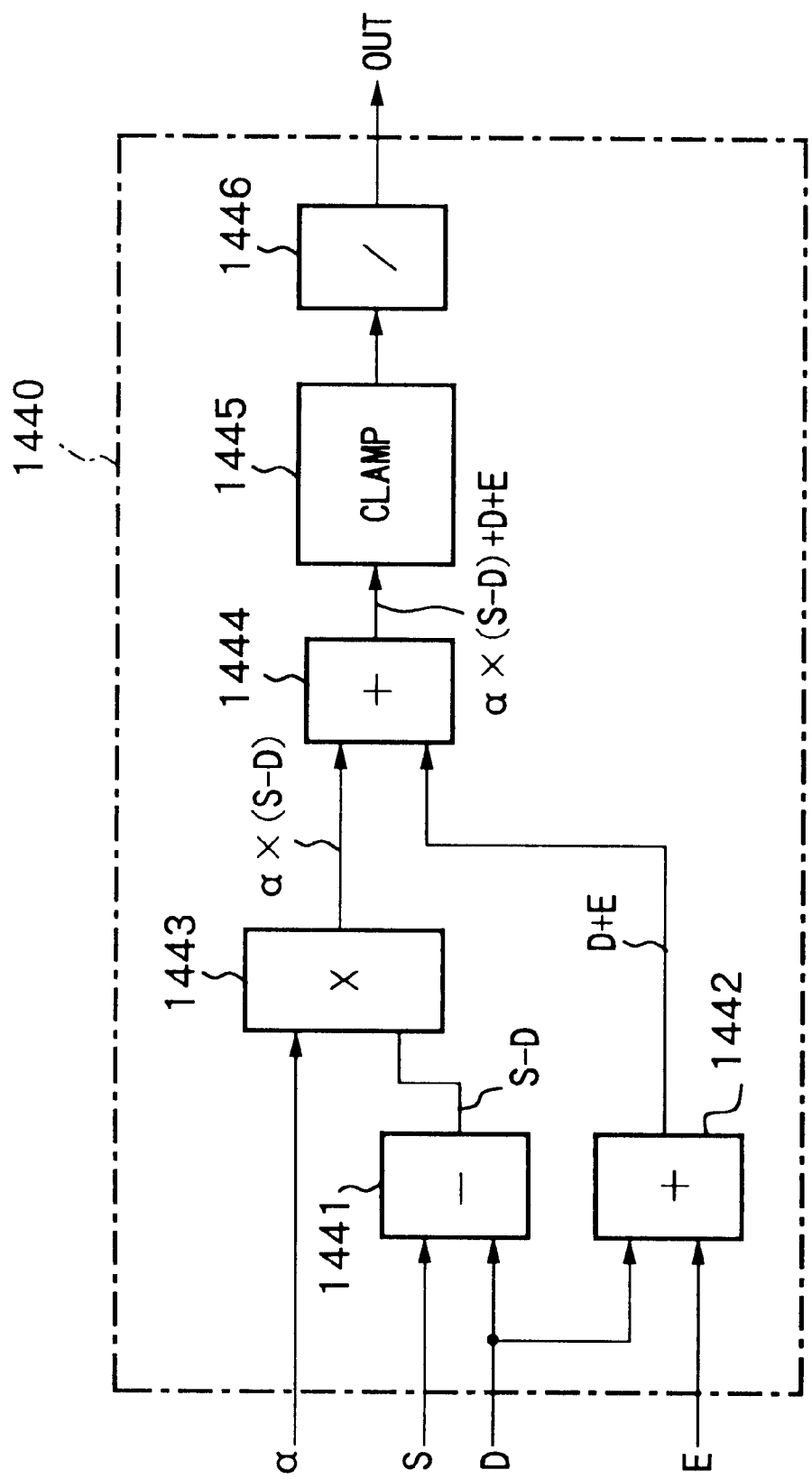
FIG. 8 is a block diagram of an example of the configuration of an α-blending/dithering circuit according to the present invention.

FIG. 8 is a block diagram of a configuration example of an α-blending/dithering circuit 1440 for performing the α-blending and the dithering in parallel.

The α-blending/dithering circuit 1440 serving as a logic circuit or a drawing data control circuit comprises, as shown in FIG. 8, a subtractor 1441 for subtracting image data D already stored in the display buffer 147b (for example, an 8-bit integer expressing [0,255]) from present image data to be drawn S (for example, an 8-bit integer expressing [0,255]), a first adder 1442 for adding error data E (for example, a 3-bit integer expressing [−4,3]) as noise data to the image data D already stored in the display buffer 147b, a multiplier 1443 for multiplying output data (S−D) of the subtractor 1441 with a blending coefficient α (for example, an 8-bit integer expressing [0,2]), a second adder 1444 for adding output data α×(S−D) of the multiplier 1443 and output data (D+E) of the first adder 1442, a clamp circuit 1445 for extracting a valid value (for example, [0,255]) of color values from the output data from the second adder 1444, and a rounding-off circuit (dividing circuit) 1446 for discarding (thinning out) the lower 3 bits from the output data of the clamp circuit 1445 and writing back the upper 5 bits to the display buffer 147b.

In the α-blending/dithering circuit 1440, processing for obtaining update amount data of the present image data S to be drawn with respect to the image data already stored in the display buffer 147b by using the blending coefficient a in the subtractor 1441 and the multiplier 1443 and processing for adding the noise data E to the image data already stored in the display buffer 147b in the first adder 1442 are performed simultaneously in parallel, data α×(S−D)+D+E obtained by adding the noise data to the data obtained by linear interpolation on two colors is obtained by adding the data obtained by the two processings in the second adder 1444, then color valid values are extracted in the clamp circuit 1445, and the extracted data is thinned out in the rounding-off circuit 1446 and written back to the display buffer 147b.

The circuit is configured to have one less multiplier and one less clamp circuit compared with the one of the related art, has a smaller circuit scale, and has a shorter computation time because the α-blending and the dithering are performed in parallel.

Note that the memory I/F circuit 144 accesses the DRAM 147 simultaneously for 16 pixels.

Figure 9:
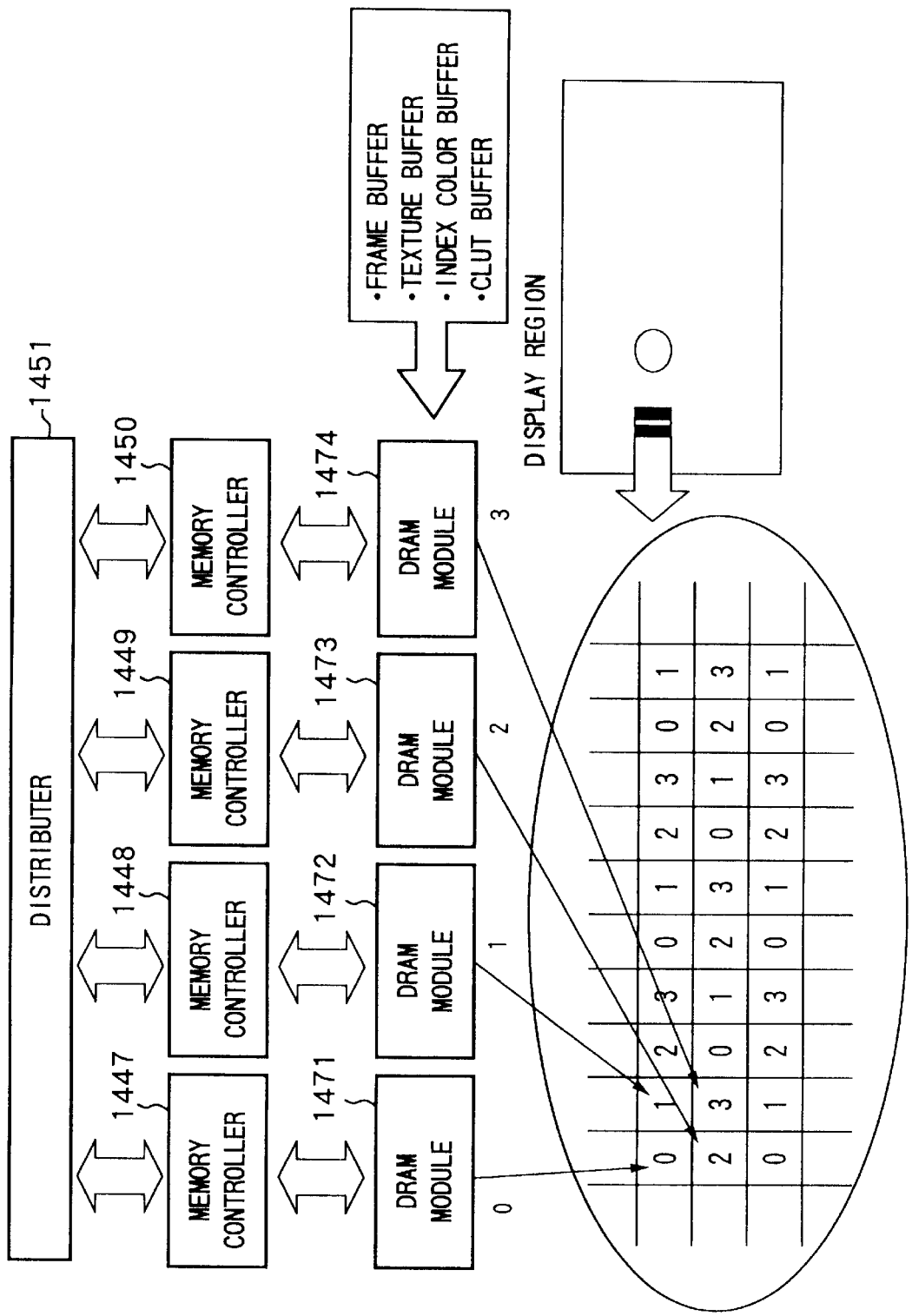
FIG. 9 is a view for explaining a data storing method according to the present invention.
Figure 10:
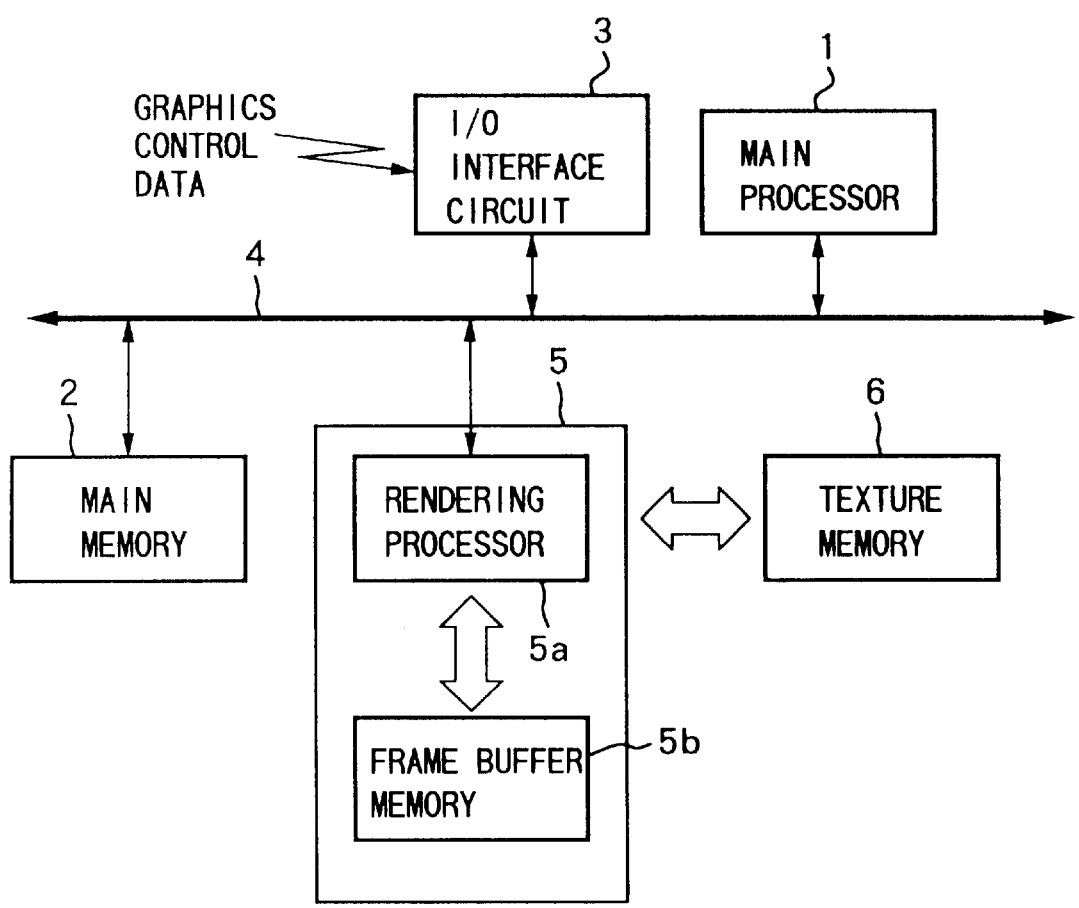
FIG. 10 is a view of the system configuration of the basic concept of a three-dimensional computer graphics system.

In the present embodiment, the DRAM 147 is divided into, for example as shown in FIG. 9. four DRAM modules 1471 to 1474, while the memory I/F circuit 144 is provided with memory controllers 1447 to 1450 corresponding to the respective DRAM modules 1471 to 1474 and a distributer 1451 for distributing data to the memory controllers 1447 to 1450.

The memory I/F circuit 144 arranges the image data in order that the adjacent portions in a display region are in different DRAM modules, as shown in FIG. 9, with respect to the respective DRAM modules 1471 to 1474.

Due to this, the processing is simultaneously carried out on a plane when drawing a plane such as a triangle. Therefore, the probability of operation of the respective DRAM modules is quite high.

CRT Control Circuit 145

The CRT control circuit 145 generates an address for display on a not shown CRT in synchronization with given horizontal and vertical synchronization signals and outputs a request for reading the display data from the display buffer 147b to the memory I/F circuit 144. In response to this request, the memory I/F circuit 144 reads a certain amount of the display data from the display buffer 147b. The CRT controller 145 has a built-in FIFO circuit for storing the display data read from the display buffer 147b and outputs the index value of RGB to the RAMDAC circuit 146 at certain time intervals.

RAMDAC Circuit 146

The RAMDAC circuit 146 stores the R, G, B data corresponding to the respective index values. It transfers R, G, B data of a digital format corresponding to the index value of RGB input from the CRT controller circuit 145 to a not illustrated digital/analog (D/A) converter to generate R, G, B data of an analog format. The RAMDAC circuit 146 outputs the generated R, G, B data to the CRT.

Next, the operation resulting from the above configuration will be explained.

In the three-dimensional computer graphic system 10, data of drawing graphics etc. are supplied from the main memory 12 of the main processor 11 or from the I/O interface circuit 13, which receives graphic data from the outside, to the rendering circuit 14 via the main bus 15.

Note that the data for drawing graphics etc. are, in accordance with need, subjected to coordinate conversion, clipping, lighting, and other geometric processing in the main processor 11 etc.

The graphic data after the geometric processing becomes polygon rendering data S11 composed of the coordinates x, y, z of the respective three vertexes of a triangle, the luminance values R, G, B, the blending coefficient α of the RGB values of the pixel to be drawn and the pixel inside the display buffer, and the texture coordinates s, t, q corresponding to the pixel to be drawn, etc.

The polygon rendering data S11 is input to the DDA set-up circuit 141 of the rendering circuit 14.

In the DDA set-up circuit 141, change data S141 indicating the difference of a side of the triangle from a horizontal direction etc. is generated based on the polygon rendering data S11. Specifically, the change, that is, the amount of change of the values to be obtained in the case of movement by a unit length, is calculated by using the starting point, the end point, and the distance between the two and output to the triangle DDA circuit 142 as change data S141.

In the triangle DDA circuit 142, the change data S141 is used for calculation of the linearly interpolated data (z, R, G, B, α, s, t, q, F) of each of the pixels inside the triangle.

Then, the calculated (z, R, G, B, α, s, t, q, F) data and the (x, y) data of each of the vertexes of the triangle are output from the triangle DDA circuit 142 to the texture engine circuit 143 as DDA data S142.

In the texture engine circuit 143, the operation for dividing the data s by the data q and the operation for dividing the data t by data q are performed for the (s, t, q) data indicated by the DDA data S142. Then, the texture sizes USIZE and VSIZE are respectively multiplied with the division results "s/q" and "t/q" to generate the texture coordinate data (u, v).

Next, a read request including the above generated texture coordinate data (u, v) is output from the texture engine circuit 143 to the SRAM 148 via the memory I/F circuit 144. Then, the (R, G, B, α) data S148 stored in the SRAM 148 is read via the memory I/F circuit 144.

Next, in the texture engine circuit 143, the (R, G, B) data in the read (R, G, B, α) data S148, and the (R, G, B) data included in the DDA data S142 from the triangle DDA circuit 142 in the former stage are blended by the ratio indicated by the α-data included in the (R, G, B, α) data S148, and the texture color at the x and y coordinates is calculated to generate the pixel data S143.

This pixel data S143 is output from the texture engine circuit 143 to the memory I/F circuit 144. In the case of a full color mode, the (R, G, B, α) data read from the texture buffer 147a can be directly used, while in the case of an index color mode, data in the color look-up table (CLUT), prepared in advance, is transferred from the texture CLUT buffer 147d to a buffer for temporary storage, which is configured by an SRAM etc. By using the CLUT of the temporary storage buffer, the actual R, G, B colors can be obtained from the color index.

Note that when the CLUT is configured by an SRAM, when a color index is input to an address of the SRAM, the actual R, G, B colors are output.

In the memory I/F circuit 144, the z-data corresponding to the pixel data S143 input from the texture engine circuit 143 and the z-data stored in the z-buffer 147c are compared for judging whether the image drawn by the input pixel data S143 is positioned closer to the viewing point than the image written in the display buffer the previous time.

When it is judged that the image drawn by the input pixel data S143 is positioned closer, the z-data stored in the buffer 147c is replaced by the z-data corresponding to the image data S143.

Next, in the memory I/F circuit 144, the α-blending for blending the (R, G, B) data included in the image data S143 and the (R, G, B) data already stored in the display buffer 147b by a blending ratio indicated by the α data corresponding to the image data S143 and the dithering for thinning out (rounding off) data in consideration of the capacity etc. of the display buffer 147b are performed in parallel in accordance with need in the α-blending/dithering circuit 1440, and the (R, G, B) data after the processing is written to the display buffer 147b.

Specifically, in the α-blending/dithering circuit 1440, the update amount data of the present image data to be drawn with respect to the image data D already stored in the display buffer 147b is obtained by using the blending coefficient α in the subtractor 1441 and the multiplier 1443. In parallel with this, the noise data E is added to the image data already stored in the display buffer 147b in the first adder 142.

Then, the data obtained by the multiplier 1443 and the data obtained in the first adder 1442 are added in the second adder 1444, and the data α×(S−D)+D+E obtained by linear interpolation of the data of two colors plus the noise data is obtained. Then a valid value of the color is extracted in the clamp circuit 1445, and the extracted data is thinned out in the rounding off circuit 1446 and written back to the display buffer 147b.

In the memory I/F circuit 144, the memory block storing the texture corresponding to the texture address of the pixel to be drawn is calculated from the texture address, a read request is made only to the memory block, and the texture data is read.

In this case, since there is no access for reading texture in memory blocks which do not store the corresponding texture, it is possible to provide more time for access for drawing.

In the same way for drawing, a memory block storing pixel data corresponding to a pixel address to be drawn is accessed to read the pixel data from the corresponding address for modify writing, then data is modified and is written back to the same address.

When performing hidden plane processing, again in the same way, a memory block storing depth data corresponding to a pixel address to be drawn is accessed to read the depth data from the corresponding address for modify writing, then the data is modified if necessary and is written back to the same address.

In such transfer of data with the DRAM 147 based on the memory I/F circuit 144, the drawing performance can be improved by performing the processing up to here in parallel.

Especially, a plurality of pixels can be simultaneously calculated by the means of partially increasing the operating frequency by providing the triangle DDA circuit 142 and the texture engine 143 portions in the same circuit in a parallel execution mode (spatial parallel) or by inserting a lot of pipelines (time parallel).

Also, the pixel data is arranged so that the adjacent portions in the display region are in different modules under the control of the memory I/F circuit 144.

Due to this, the processing is simultaneously carried out on a plane when drawing a plane such as a triangle. Therefore, the probability of operation of the respective DRAM modules is quite high.

When displaying an image on a not illustrated CRT, in the CRT control circuit 145, the display address is generated in synchronization with the given horizontal and vertical synchronization frequencies and a request for transferring the display data is sent to the memory I/F circuit 144.

In the memory I/F circuit 144, in accordance with the request, a certain amount of the display data is transferred to the CRT control circuit 145.

In the CRT control circuit 145, the display data is stored in a not illustrated display use FIFO etc. and index values of RGB are transferred to the RAMDAC 146 at certain intervals.

The RAMDAC 146 stores the RGB values corresponding to the indexes of the RGB, and the RGB values corresponding to the index values are transferred to the not illustrated D/A converter.

Then, the RGB signal converted to an analog signal in the D/A converter is transferred to the CRT.

As explained above, according to the present embodiment, processing for obtaining update amount data of the present image data S to be drawn with respect to the image data already stored in the display buffer 147b by using the blending coefficient α in the subtractor 1441 and the multiplier 1443 and processing for adding the noise data E to the image data already stored in the display buffer 147b in the first adder 1442 are performed simultaneously in parallel, data α×(S−D)+D+E which is obtained by adding the noise data to the data obtained by linear interpolation of two colors is obtained by adding the data obtained by the two processings in the second adder 1444, then color valid values are extracted in the clamp circuit 1445, and the extracted data is thinned out in the rounding-off circuit 1446 and written back to the display buffer 147b. Thus, the circuit is configured by one less multiplier and one less clamp circuit compared with the one of the related art and the circuit scale is smaller. Also, since the α-blending and the dithering are performed in parallel, there are the advantages that the computation time can be made shorter and higher speed processing can be realized.

Also, according to the present embodiment, because of the configuration of storing the texture data needed by the display data and at least one graphic element in a DRAM 147 built in a semiconductor chip, it becomes possible to store the texture data in a portion other than a display region, so the built-in DRAM can be efficiently used and an image processing apparatus enabling a high speed processing operation with reduced power consumption can be realized.

Further, a single memory system can be realized and all processing can be carried out inside. As a result, there is a large paradigm shift in terms of the architecture as well.

Also, since the memory can be efficiently used, the processing can be carried out by just the DRAM embedded inside. Therefore, the wide bandwidth between the memory and the drawing system resulting from the internal provision can be sufficiently utilized. Also, it becomes possible to install specific processing in the DRAM.

Also, by giving identical functions in the DRAM in parallel as a plurality of independent modules 1471 to 1474, the efficiency of parallel operations can be improved. When the number of bits of the data is simply large, the efficiency of use of data is deteriorated and improvement of the performance is limited to cases of certain conditions. To improve the average performance, bit lines can be efficiently used by providing a plurality of modules having certain degrees of functions.

Further efficient usage of the bit lines becomes possible by arranging the display elements at adjacent addresses to be different blocks of the DRAM from each other in the display address space. When there are frequent accesses to relatively fixed display regions as in drawing graphics, the probability increases of the modules being able to perform processing simultaneously and the drawing performance can be improved.

Further, since indexes of index colors and values of a color look-up table therefor are stored inside the built-in DRAM 147 in order to store more texture data, the texture data can be compressed and the built-in DRAM can be efficiently used.

Also, since depth information of an object to be drawn is stored in the built-in DRAM, hidden plane processing can be performed simultaneously and in parallel with the drawing.

Normally, the drawn picture is desired to be displayed, however, since it is possible to store the texture data and the display data together as a unified memory in the same memory system, the drawing data can be used as texture data instead of being used for direct display.

This is effective when preparing the necessary texture data by drawing when necessary. This is also an effective function for preventing the amount of the texture data from swelling.

Also, by providing the DRAM inside the chip, the high speed interface portion is completed just inside the chip, so it is no longer necessary to drive an I/O buffer having a large additional capacity or a wiring capacity between chips. Therefore, the power consumption can be reduced compared with a not built-in case.

Accordingly, a setup which uses a variety of techniques to enable everything to be accommodated in a single chip is becoming an essential technical element for future digital equipment such as portable data terminals.

Note that the present invention is not limited to the above embodiments.

In the three-dimensional computer graphic system 10 shown in FIG. 1, the example was given of a configuration using an SRAM 148, however, it can be configured without the SRAM 148 as well.

Furthermore, in the three-dimensional computer graphic system 10 shown in FIG. 1, the example was given wherein the geometric processing for generating the polygon rendering data was performed in the main processor 11, but the processing can be carried out in the rendering circuit 14 as well.

Summarizing the effects of the invention, as explained above, according to the present invention, there are the advantages that the size of the circuit can be made small, the α-blending and the dithering can be performed in parallel, the calculation time can be shortened, and high speed processing can be realized.

Also, according to the present embodiment, because of the configuration of storing the texture data needed by the display data and at least one graphic element in a storage circuit which is installed together with a logic circuit in a semiconductor chip, it becomes possible to store the texture data in a portion other than a display region, so the built-in storage circuit can be efficiently utilized and an image processing apparatus enabling a high speed processing operation with reduced power consumption can be realized.

Also, by giving identical functions in the memory in parallel as a plurality of independent modules, the efficiency of parallel operations can be improved.

Furthermore, since display elements in adjacent addresses are arranged to be in mutually different memory blocks in the display address space, when there are frequent accesses to relatively fixed display regions as in drawing graphics, the probability increases of the modules being able to perform processing simultaneously and the drawing performance can be improved.

While the invention has been described with reference to specific embodiment chosen for purpose of illustration, it should be apparent that numerous modifications could be made thereto by those skilled in the art without departing from the basic concept and scope of the invention.

What is claimed is:

1. An image processing apparatus for performing α-blending and dithering on image data, comprising:
   a storage circuit in which a t least display image data is drawn and
   a logic circuit for finding data on the amount of update of present image data to be drawn from image data already stored in the storage circuit using a given blending coefficient α, finding the data comprised of noise data added to the image data stored in the storage circuit, adding the two obtained data to find data comprised of the noise data added to data obtained by linear interpolation of two colors, extracting valid value of color from the data, thinning out the extracted data, and writing back the same to the storage circuit.

2. An image processing apparatus as set forth in claim 1, wherein the logic circuit comprises:
   a subtractor for subtracting image data D already stored in the storage circuit from present image data S to be drawn to generate subtractor output data (S−D);
   a first adder for adding error data E comprised of noise data to the image data D already stored in the storage circuit to generate first-adder output data (D+E);
   a multiplier for multiplying the subtractor output data (S−D) with a blending coefficient α to generate multiplier output data α×(S−D);
   a second adder for adding the multiplier output data α×(S−D) and the first-adder output data (D+E);
   a clamp circuit for extracting valid value of color from output data of the second adder; and
   a rounding off circuit for thinning out predetermined data from output data of the clamp circuit and writing it back to the storage circuit.

3. An image processing apparatus as set forth in claim 1, wherein
   the storage circuit stores texture data required by at least one graphic element in addition to display use image data;

the logic circuit performs processing for applying texture data to the surface of a graphic element of display data based on stored data in the storage circuit; and the storage circuit and the logic circuit are both accommodated in one semiconductor chip.

4. An image processing apparatus as set forth in claim 3, wherein:

the storage circuit is divided into a plurality of modules having identical functions; and the logic circuit accesses the modules in parallel.

5. An image processing apparatus as set forth in claim 4, wherein display elements at adjacent addresses are arranged to be in different memory blocks in a display address space In the storage circuit.

6. An image processing apparatus for performing rendering by receiving polygon rendering data including three-dimensional coordinates (x, y, z), R (red), G (green), and B (blue) data, a blending coefficient α, homogeneous coordinates (s, t) of texture, and homogeneous term q with respect to each vertex of the unit graphic, at least comprising:

a storage circuit for storing display image data and texture data required by at least one graphic element;

a drawing data control circuit for finding data on the amount of update of present image data to be drawn from image data already stored in the storage circuit using a given blending coefficient α, finding the data comprised of noise data added to the image data stored in the storage circuit, adding the two obtained data to find data comprised of the noise data added to data obtained by linear interpolation of two colors, extracting valid value of color from the data, thinning out the extracted data, and writing back the same to the storage circuit;

an interpolation data generation circuit for interpolating polygon rendering data of vertexes of the unit graphic and generating interpolation data of pixels positioned inside the unit graphic; and a texture processing circuit for dividing homogeneous coordinates (s, t) of texture included in the interpolation data by a homogeneous term q to generate division results "s/q" and "t/q", using texture data corresponding to the division results "s/q" and "t/q" to read texture data from the storage circuit, and performing processing for applying the texture data to the surface of a graphic element of the display use image data;

said storage circuit, said drawing data control circuit, said interpolation data generation circuit, and said texture processing circuit being accommodated in one semiconductor chip.

7. An image processing apparatus as set forth in claim 6, wherein:

the storage circuit is divided into a plurality of modules having identical functions; and the logic circuit accesses the modules in parallel.

8. An image processing apparatus as set forth in claim 7, wherein display elements at adjacent addresses are arranged to be in different memory blocks in a display address space in the storage circuit.

9. An image processing method for drawing in a storage circuit by performing α-blending and dithering on image data, including the steps of:

performing in parallel processing for finding data on the amount of update of present image data to be drawn from image data already stored in the storage circuit using a given blending coefficient a and processing for adding noise data to the image data stored in the storage circuit and adding the data obtained by the two processing to find data comprised of the noise data added to data obtained by linear interpolation of two colors and extracting valid value of color from the data, thinning out the extracted data, and writing back the same to the storage circuit.

* * * * *

UNITED STATES PATENT AND TRADEMARK OFFICE
CERTIFICATE OF CORRECTION

PATENT NO. : 6,473,091 B1
DATED : October 29, 2002
INVENTOR(S) : Ryohei Iida et al.

It is certified that error appears in the above-identified patent and that said Letters Patent is hereby corrected as shown below:

<u>Title page,</u>
Item [73], Assignee, add second assignee:
-- Kabushiki Kaisha Toshiba, Kanagawa (JP) --.

Signed and Sealed this

Sixth Day of January, 2004

JAMES E. ROGAN
*Director of the United States Patent and Trademark Office*